United States Patent [19]

Schwitzgebel

[11] Patent Number: 5,285,000
[45] Date of Patent: Feb. 8, 1994

[54] COMPOSITION AND PROCESS FOR ORGANIC AND METAL CONTAMINANT FIXATION IN SOIL

[76] Inventor: Klaus Schwitzgebel, 7507 Chimney Corners, Austin, Tex. 78731

[21] Appl. No.: 975,516

[22] Filed: Nov. 12, 1992

[51] Int. Cl.$^5$ .......................... B09B 3/00; E02D 3/12
[52] U.S. Cl. ............................... 588/256; 106/287.19; 405/128; 405/263
[58] Field of Search ..................... 588/252, 256, 257; 405/128, 129, 263, 266; 106/287.18, 287.19, 900

[56] References Cited

U.S. PATENT DOCUMENTS

| | | | |
|---|---|---|---|
| 4,116,705 | 9/1978 | Chappell | 588/257 |
| 4,132,558 | 1/1979 | Uchikawa et al. | 588/257 |
| 4,600,514 | 7/1986 | Conner | 588/256 X |
| 5,155,042 | 10/1992 | Lupton et al. | 588/256 X |

*Primary Examiner*—David H. Corbin
*Attorney, Agent, or Firm*—Joseph F. Long

[57] ABSTRACT

A method and compositions using a first ferrous iron containing solution with the iron concentration in excess of theoretical requirements to treat a contaminated site to reduce hexavalent chromium to trivalent chromium and coprecipitate trivalent chromium with other heavy metals and using a second solution of silicate containing a destabilizing salt to form a relatively impermeable gel in the contaminated site thereby fixing metals and organics to the extent that there should be no detectable ground water contamination.

9 Claims, No Drawings

COMPOSITION AND PROCESS FOR ORGANIC AND METAL CONTAMINANT FIXATION IN SOIL

This work was sponsored by the Department of Energy under the auspices of Argonne National Laboratory, Contract 02112401 with the objective of in situ reduction of chromates and fixation of heavy metals, chromium, lead, zinc, copper, cadmium and nickel.

BACKGROUND OF THE INVENTION

Both government and industry are in need of better, lower cost remediation of contaminated land sites. Objectives of the invention include a single composition of fix heavy metals and organics by injection without requiring soil mixing for sites with minimal contamination and for heavily contaminated sites injection of a first composition to precipitate heavy metals and a second composition to fix the precipitate to prevent leaching. Prevention of migration, isolation through impermeable barriers and containment of organics, inorganic metals and salts and radionuclides are desirable. The subject invention covers reduction of chromium from a valence of 6, Cr VI, to a valence of 3, Cr III, to allow precipitation as an hydroxide along with other heavy metals and immobilization in situ of the precipitate to prevent migration. Containment of organic compounds such as PCB, polychlorinated, biphenyls, would be expected with the same treatment. We found in the laboratory that a dual solution treatment allows use of a first solution for reduction of hexavalent chromium to trivalent chromium which then co-precipitates in calcarious type soils, or soils with pH adjusted about 8.5, as an hydroxide along with other heavy metals comprising cadmium, copper, nickel, zinc and lead. For most effective heavy metal co-precipitation we have found a large excess of iron salt over stoichometric amount for chromate reduction is necessary. Further, we have found that a second solution containing approximately from one-half to seven and one-half percent sodium silicate and approximately 0.2 to one percent sodium aluminate when injected or mixed into the contaminated soil following the first solution treatment forms a gel to most effectively contain heavy metals. We would expect that such a gel would also contain most any organic or metallo-organic compounds in soil that is non-saturated with these contaminates. More limited laboratory data indicates that with chromium contaminant at about 30 ppm in soil that a single step solution treatment reduces and precipitates chromium while also reducing soil permeability.

In the absence of chromate in the heavy metal contaminated soils a first solution containing ferric iron salt is used to co-precipitate as hydroxides the heavy metals with the iron. Co-precipitation has been shown in previous work by the inventor to reduce each of the other heavy metals to lower level than would be attained by hydroxide precipitation of one metal alone. Use of soluble treating compositions allows simple injection in the soil to permeate and precipitate heavy metals and use of a second gelling or stabilizing solution to re-saturate the soil to form a gel to reduce the leaching rate or permeability to the point of being almost impermeable.

Actual containment of heavy metals and/or organics in the contaminated soil will be a function of soil permeability or aqueous flow-through rate and concentration of the heavy metals or organics that may be leached out of the gel. Using known equations and data from soil samples after treatment with the iron solution and after formation of the stabilizing gel, calculations indicatate that to replace one volume of the liquid saturating the contaminated soil with an aqueous leaching agent should require over 250 years. This assumes continued stability of the gel structure. At any rate since we would expect the gel structure to be renewable so as an effective remediation method is indicated.

The prior art that we find that is closet to the subject invention is European Patent application, Publication No. 0 352,096 A2 which is application number 89307329.6 filed Jul. 19, 1989 by Lapat Industries. The process in the application is aimed at treating sludge, soils and slurries and requires mixing a reducing agent such as ferrous salt or sodium sulfite with the material being treated to reduce chromate VI to chromate III and addition of sodium silicate primarily to form metasilicates with anions and secondarily to form a silicate shell. In all cases calcium or magnesium oxides are used. Our invention is based on a different chemical approach; that is, to co-precipitate heavy metals in place as hydroxides, at the same time and with the same iron salt used to reduce chromium VI to chromium III. We have found co-precipitation as hydroxides more completely precipitates metals than single hydroxide precipitation. Further, we use only soluble components in our sodium silicate addition in order that we may saturate soils in place to achieve the most economical treatment.

SUMMARY OF THE INVENTION

We have shown in the laboratory that three different calcarious type soils contaminated with up to four hundred parts per million of chromates and four hundred parts per million each of lead, cadmium, zinc, nickel, and copper could be treated with ferrous iron to cause reduction of the hexavalent chromate to trivalent chromium with precipitation due to alkalinity of the soil. In a non-alkaline soil, the pH would be adjusted with a base chemical such as sodium hydroxide. With subsequent treatment with a sodium silicate gel forming solution and leaching with approximately 20 pore volumes of distilled water per one volume of soil over 98% to 99% of the chromium and other metals remained in the soil. In addition, the gel formation reduces soil permeability to the point that calculations indicate that less than one part per million of chromate would leach out of a site contaminated with 400 ppm chromate. Further, we have shown that if chromium VI is not present that lead, zinc, copper, cadmium and nickel in contaminated soil may be treated with 6600 ppm ferric salt and a sodium silicate alumina gelling solution to effectively contain the heavy metals in soils at a Ph of 7.5 to 8.5. We would expect that similar containment in acid soils would also occur because stable sodium silicate gels also form at a pH of 5 or less. Gel formation is most rapid at pH's from about 6.0 to 9.0. Commercially available sodium silicate solutions were used with concentration of silicon dioxide in the sodium silicate gels varying from about 0.5% to 7.5%.

Using 6600 ppm of ferric iron and sodium silicate gel we found a maximum of 0.5 ppm of lead, zinc, cadmium, copper and nickel extractable by distilled water when extracting forty times with enough distilled water to fill the void volume of the soil used each time.

Since the ferric or ferrous salt used to permeate the soil and reduce chromium VI and co-precipitate with other metals is in solution, the soil may be permeated to saturate rather than be mechanically mixed. In the same way the silicate mixture forms a solution so that the treated soil may be resaturated to reduce permeability in order to essentially encapsulate the treated area without mechanical mixing. Note that both sodium and potassium silicate should be suitable with sodium silicate being cost preferable.

Protection of ground water or reduction of leakage from a contaminated site after treatment is a function of leachate concentration and flow rate of liquid through the soil. The soils investigated had hydraulic coefficients, a measure of permeability, from $1.2 \times 10^{-2}$ cm/sec to $3.8 \times 10^{-4}$ cm/sec. Silica treatment to form a stabilizing gel decreased these coefficients to $6 \times 10^{-7}$ cm/sec.

Our leaching experiments indicated that after treatment and extraction with water that over 97% of metals remained in soils after leaching with approximately 40 pore volumes or 40 times the liquid to fill the void volume in the soil. Now with a void volume of 41 cc/100 gm as shown in the soil sample labeled Colorado and an untreated permeability of $2 \times 10^{-2}$ cm/sec. and a treated permeability of $6 \times 10^{-7}$ cm/sec and with density of soil at 1.15 g/cc we calculate a leach rate through one cubic meter of treated soil of 1.9 liters per year and to elute the 40 pore volumes or 18,800 liters in one cubic meter would require 9900 years. At this time, calculations show that around 97.81% of the metal would remain in the soil, in the worst case. In this worst case metal in the leachate was about 0.5 ppm; however, with untreated soil permeability being about $2 \times 10^{-2}$ and treated soil permeability being about $6 \times 10^{-7}$, we would expect each gallon of leachate from the treated site to mix with $3 \times 10^4$ or 30,000 gallons of ground water, and the metal in this mixture would be below 0.2 parts per billion. Since test holes may be drilled around or through a treated contaminated site and the eluted water tested at intervals to determine leakage or gel degradation we conclude that the process as outlined should provide acceptable containment.

DETAILED DESCRIPTION OF THE INVENTION

The overall objective of the invention is to prevent leaching of both heavy metals and organic contaminants from contaminated ground sites.

Leaching is a function of soil permeability or flow of the leaching agent, which is normally water, through the soil and concentration of the metal or organics being leached out. Leaching can then result in ground water contamination.

Containment will be most effective with minimum leaching from the soil and minimum soil permeability. For experimental work three well mixed and ground soil samples from Travis and Williamson Counties in Texas were used to determine soil fixation of metals by chemical treatment followed by addition of a soil stabilizing agent to reduce soil permeability. All three soil samples were calcareous and a 50% aqueous slurry gave pH values from 7.7 to 8.5. The three samples were labeled Balcones, Round Rock and Colorado for convenience in identifying the different soil characteristics. Physical and chemical characteristics of the three soil samples were as follows:

TABLE I

| Parameter | Balcones | Round Rock | Colorado |
| --- | --- | --- | --- |
| Density (g/ml) | 1.40 | 1.20 | 1.15 |
| Soil Pore Volume (ml/100 g soil) | 33 | 56 | 41 |
| Moisture % | 1.9 | 4.2 | 3.3 |
| pH of 50% Slurry | 8.50 | 7.90 | 7.70 |
| Calcium (ppm) | 320,000 | 120,000 | 100,000 |
| Magnesium (ppm) | 61,000 | 7,600 | 5,100 |
| Iron (ppm) | 290 | 330 | 310 |
| Manganese (ppm) | 5.3 | 880 | 320 |
| Copper (ppm) | 6.0 | 9.0 | 3.7 |
| Zinc (ppm) | 11 | 34 | 28 |
| Chromium (ppm) | 1.3 | 120 | 3.4 |
| Lead (ppm) | 0.12 | 2 | 0.91 |
| Cadmium (ppm) | 0.03 | <0.01 | <0.01 |
| Nickel (ppm) | 0.74 | 2.00 | 1.50 |
| $CO_2$ % | 30.1 | 9.6 | 10.3 |
| Organic Carbon (ppm) | 2,100 | 5,600 | 3,700 |

The soil samples were ground and sieved and particles less than 2 mm were used for experimental work.

Experimental work was carried out as follows with all analytical work performed in an approved manner with proper calibration using standard samples where indicated.

Soil impregnation with metals (Cr VI, Pb, Zn, Cu, Cd, Ni) was achieved by dissolving the metal salts in one soil pore volume of distilled water and mechanically mixing the aqueous solution into the soil. One soil pore volume is the void volume and is shown in Table I for each sample.

After mechanically mixing of the metal salts with each sample, the mixture was allowed to soak for several hours and was then air dried overnight at 35° C. and repulverized. The test matrices indicating metal addition to the samples are shown below:

TABLE II

| Abbreviation | Cr (ppm) | Pb (ppm) | Zn (ppm) | Cu (ppm) | Cd (ppm) | Ni (ppm) | Total mg Metals/1000 g soil |
| --- | --- | --- | --- | --- | --- | --- | --- |
| Cr 40 | 40 | — | — | — | — | — | 40 |
| Cr 400 | 400 | — | — | — | — | — | 400 |
| Met 40 | — | 40 | 40 | 40 | 40 | 40 | 200 |
| Met 100 | — | 100 | 100 | 100 | 100 | 100 | 500 |
| Met 400 | — | 400 | 400 | 400 | 400 | 400 | 2000 |
| Cr 40 Met 40 | 40 | 40 | 40 | 40 | 40 | 40 | 240 |
| Cr 400 Met 400 | 400 | 400 | 400 | 400 | 400 | 400 | 2400 |

In this table Met 100 means 100 ppm of each metal. With 30 gms of soils being used in the experiments the total metal is as follows:

400 ppm metal correspond to 12 mg/30 g soil = 12,000 ug/30 gm soil
100 ppm metal correspond to 3 mg/30 g soil = 3,000 ug/30 gm soil
40 ppm metal correspond to 1.2 mg/30 g soil = 1,200 ug/30 gm soil Iron treatment was achieved by mixing, soaking and air drying. Ferrous iron, FeII, was added to chromate containing soils and in the absence of chromate the FeII was oxidized with $H_2O_2$ after addition to the soils. This step could be eliminated by the direct application of ferric salt to the soil.

Silica treatment or gel treatment consisted of two approaches. In the experiments using acid gels, the silica solution was destabilized with sulfuric acid before addition to the soil. In the experiments using alkaline or zeolite gels, destabilization was triggered by sodium aluminate addition. Sodium, or potassium or ammonium salts of chlorides, phosphates, carbonates and other salts are used as sodium silicate destabilization salts. Following the addition of the destabilized silica solutions to the soil, the mixture was air dried at 35° C. and repulverized.

Leaching was determined in a first method by putting the treated 30 gm dried pulverized sample in 20 mm diameter Pyrex column fitted with a fritted glass exit end and pouring the leaching fluid on top and adjusting the pressure head to give 10 ml of effluent in 1 to 2 hrs. Effluent was captured in pore volume fractions, that is, for a 30 gm sample with a void volume or pore volume of 33 ml/100 gm of soil each pore volume fraction would be 9.9 ml of effluent. Each fraction was analyzed for pH and then acidified with concentrated nitric to allow metal analysis using an Atomic Absorption Spectrograph.

Table III shows results of several experiments wherein different soil loadings with chromium VI, different soil samples, and different amounts and differing concentrations of silica gel treatments were used. In these experiments the silica gel was destabilized by adding sufficient sulfuric acid to adjust the pH to 8.5. In the first column of the table we show the experiment number; the second column shows type or soil; the third column shows soil loading or contamination with chromate VI; the fourth column shows parts per million ferrous iron added to the soil; the fifth column indicates the percent silica in the gel treatment fluid in cases where the gel treatment was applied; the sixth column indicates type of extraction fluid used, DI indicates distilled water and TCLP #1 is an acidic extractant; the seventh column indicates pH range of the effluent; and the eighth column indicates parts per million, PPM of chromium eluted in first 100 ml of eluent except for Experiment No. 122 through 126 wherein data is for 200 ml effluent. The ninth column is labeled fixation percentage and this indicates the percentage of the metal that is held in the soil with no treatment and with treatment as indicated. Consider now the cases using distilled water extractant and no treatment. We see Round Rock soil absorption to be somewhere between 0.83 and 19.98 percent; on Balcones soil the absorption is about 1.1 percent and on Colorado soil about 19.84 percent. Examination of the table indicates that ferrous iron treatment alone fixes from 96.36 percent, Exp. #39, to 98.59 percent, Exp. #9 and #12, of the chromium in the soil.

TABLE III

Treatment Evaluation of Soils Impregnated with Cr VI

| Exp # | Soil | ppm Cr VI | ppm Fe II | % Silica in gel | Extr. Fluid | pH range of effluent | Elution in first 100 ml (*200 ml) ppm | Fixation % |
| --- | --- | --- | --- | --- | --- | --- | --- | --- |
| 122 | RR | 40 | — | — | TCLP #2 | 7.0→6.9 | 3.86 | 36.43 |
| 123 | RR | 40 | 220 | — | TCLP #2 | 6.9→7.2 | 0.09 | 98.50 |
| 125 | RR | 40 | 220 | 1.4% | TCLP #2 | 6.5→6.5 | 0.12 | 97.90 |
| 126 | RR | 40 | 220 | 2.1% | TCLP #2 | 6.6→6.2 | 0.09 | 98.42 |
| 11 | Col. | 400 | — | — | DI | 7.9→8.1 | 96.2 | 19.84 |
| 12 | Col. | 400 | 1680 | — | DI | 7.2→7.6 | 1.7 | 98.59 |
| 24 | Col. | 400 | 1680 | 1.4% | DI | 7.7→8.3 | 1.1 | 99.100 |
| 26 | Col. | 400 | — | — | TCLP #1 | 7.5→7.2 | 83.8 | 30.13 |
| 27 | Col. | 400 | 1680 | — | TCLP #1 | 7.7→7.5 | 1.4 | 98.85 |
| 30 | Col. | 400 | 1680 | 1.4% | TCLP #1 | 7.7→7.0 | 1.5 | 98.76 |
| 32 | Col. | 400 | — | — | TCLP #2 | 6.4→6.8 | 75.6 | 36.98 |
| 33 | Col. | 400 | 1680 | — | TCLP #2 | 6.8→6.4 | 1.0 | 99.19 |
| 36 | Col. | 400 | 1680 | 1.4% | TCLP #2 | 7.0→6.6 | 0.7 | 99.38 |
| 8 | Balc. | 400 | — | — | DI | 7.9→8.0 | 118.7 | 1.10 |
| 9 | Balc. | 400 | 1680 | — | DI | 7.6→7.9 | 1.7 | 98.59 |
| 21 | Balc. | 400 | 1680 | 1.8% | DI | 7.7→8.0 | 2.1 | 98.28 |
| 14 | Balc. | 400 | — | — | TCLP #1 | 7.9→7.6 | 110.7 | 7.70 |
| 15 | Balc. | 400 | 1680 | — | TCLP #1 | 7.9→7.3 | 1.5 | 98.75 |
| 16 | Balc. | 400 | 1680 | 1.8% | TCLP #1 | 7.8→7.6 | 2.1 | 98.28 |
| 1 | RR | 400 | — | — | DI | 7.8→7.6 | 119.0 | 0.83 |
| 38 | RR | 400 | — | — | DI | 8.0→7.9 | 96.1 | 19.98 |
| 44 | RR | 400 | — | — | DI | 7.9→8.0 | 99.2 | 17.33 |
| 39 | RR | 400 | 2200 | — | DI | 7.6→8.0 | 4.4 | 98.36 |
| 42 | RR | 400 | 2200 | 3.0% | DI | 7.9→8.5 | 4.3 | 96.43 |
| 50 | RR | 400 | — | — | TCLP #1 | 7.2→7.4 | 98.0 | 18.36 |
| 56 | RR | 400 | — | — | TCLP #1 | 7.7→7.5 | 81.1 | 32.39 |
| 57 | RR | 400 | 2200 | — | TCLP #1 | 7.8→7.3 | 3.0 | 97.54 |
| 60 | RR | 400 | 2200 | 3.0% | TCLP #1 | 7.7→7.2 | 1.4 | 98.86 |
| 62 | RR | 400 | — | — | TCLP #2 | 7.1→7.0 | 91.1 | 24.04 |
| 68 | RR | 400 | — | — | TCLP #2 | 7.1→7.2 | 98.0 | 18.28 |
| 63 | RR | 400 | 2200 | — | TCLP #2 | 7.2→7.3 | 0.2 | 99.87 |
| 66 | RR | 400 | 2200 | 3.0 | TCLP #2 | 7.6→7.2 | 0.9 | 99.27 |

Established practice in testing amount of leaching in soils as outlined in SW 846 and EPA 600 is to extract treated samples with distilled water and/or with a TCLP Extraction Fluid with a pH of 4.93±0.05 labeled TCLP #1, and/or an extraction fluid with a pH of 2.88±0.05. This activity is achieved with acetic acid in water and is labeled TCLP #2. In the soil samples tested the TCLP #2 was so acidic as to cause $CO_2$ generation and since even acid rain would not be so acidic most of our work was done using distilled water labeled DI and TCLP #1 fluid of 4.93±05 pH. This pH was achieved by use of acetic acid and sodium acetate in distilled water thereby forming a buffered solution. Consider Expt #1 in Table III. This shows that 400 ppm of chromate has been added to the soil sample labeled Colorado and that with no treatment and with extraction with distilled water that there is 96.2 ppm chromate in the eluted water and that only 19.84 percent of the chromium is held in the soil. Now in Exp #12 after treatment with 1680 ppm ferrous iron, the eluent from distilled water extraction contains 1.7 ppm chromium and 98.59 percent of the chromium remains fixed in the soil. Consideration of the total data in Table III indicates that with no treatment that between 0.83 and 19.84 percent of chromium remains after exhaustive water leaching. Similarly after treatment with ferrous iron alone between 96.36, Exp. #39, and 98.59, Exp. #12, percent would remain in soil. Treatment with a gelling agent and grinding and extracting had relatively little influence, Exp. #24 and Exp. #42, on the amounts fixed in the soil; however, as will be later discussed, the water permeability of the treated site is so low that if the eluent from a treated site containing from 1.1 to 4.4 ppm is mixed with eluent from the same area of a non-contaminated site the resultant mixture will contain a concentration of less than 0.2 parts per billion of chromium. Table III would indicate satisfactory fixation by treatment of a chromate contaminated site because of the very low permeability after gel formation.

In Table IV we have summarized experiments showing chromate reduction and fixation of chromium, lead, zinc, copper, cadmium and nickel in Colorado soil using differing quantities of ferrous iron and differing concentration of silica in the gel solution. In each case the silica was destabilized by adjusting the pH to approximately 8.5 with sulfuric acid.

Examination of the table indicates satisfactory fixation for Chromate using four and one-half parts of ferrous salt to one part chromate. Lead chromate is quite insoluble and with the 40 parts per million loading of chromate this may explain essentially no elution because of lead chromate formation. At the 40 ppm chromium level there is 0.1 ppm or less chromium in the eluent and percentage fixation for chromium is excellent when eluting agent is distilled water, buffered water at pH 4.89 or acidic water. With the distilled water extractant eluent contains 0.20 ppm or less and with gel treatment to reduce permeability leakage from a treated site would be below detectable levels for zinc, copper, cadmium and nickel. With the pH 4.9 buffered extractant, the eluent from a treated site would still have a concentration of less than 1 ppm of zinc, copper cadmium or nickel. With 400 ppm contamination and treatment with 2200 ppm of ferrous iron and 2.1 percent silica in the gelling agent eluent from the distilled water extraction contained 0.55 ppm chromium, 0.01 ppm lead, 0.19 ppm zinc, 0.5 ppm copper and 2.93 ppm cadmium and 1.3 ppm of nickel. Note that gel treatment did markedly reduce the chromium, zinc, cadmium and nickel in the eluent. The acidic extraction produced unacceptable leakages of 7.35 to 51.8 ppm for zinc, copper, cadmium, and nickel.

TABLE IV

Chromate Reduction and Fixation of Cr, Pb, Zn, Cu, Cd, Ni by Iron II and Acid Gel Column Experiments

| | |
|---|---|
| 30 g Soil: | Colorado |
| Leaching Fluid: | DI, TCLP #1, TCLP #2 |
| Iron II Addition: | 1.7 × stoichiometry for Cr VI reduction |
| Colume Effluent | 200 ml |
| Cr 40 Met 40: | 40 ppm each of Cr VI, Pb, Zn, Cu, Cd, Ni |
| Cr 400 Met 400: | 400 ppm each of Cr VI, Pb, An Cu, Cd, Ni |

| | | Treatment | | | | Cr Elution | |
|---|---|---|---|---|---|---|---|
| Exp. # | Metal Loading | Iron II ppm | Silica % | Extr. | pH effluent | 200 ml ppm | Fixed % |
| Colorado | | | | | | | |
| 123 | Cr 40 Met 40 | 0 | — | DI | 6.8→7.4 | 2.60 | 56.00 |
| 129 | Cr 40 Met 40 | 220 | — | DI | 6.8→7.5 | .08 | 98.75 |
| 131 | Cr 40 Met 40 | 220 | 1.2 | DI | 6.8→7.5 | .09 | 98.50 |
| 132 | Cr 40 Met 40 | 220 | 1.7 | DI | 6.8→7.7 | .08 | 98.50 |
| 134 | Cr 40 Met 40 | 0 | — | TCLP #1 | 7.5→7.2 | 2.60 | 56.57 |
| 135 | Cr 40 Met 40 | 220 | — | TCLP #1 | 7.3→7.2 | .09 | 98.50 |
| 137 | Cr 40 Met 40 | 220 | 1.2 | TCLP #1 | 7.1→6.7 | .10 | 98.25 |
| 138 | Cr 40 Met 40 | 220 | 1.7 | TCLP #1 | 7.6→7.4 | .10 | 98.25 |
| 140 | Cr 40 Met 40 | 0 | — | TCLP #2 | 7.8→6.9 | 4.12 | 30.50 |
| 141 | Cr 40 Met 40 | 220 | — | TCLP #2 | 7.3→6.7 | .07 | 98.75 |
| 143 | Cr 40 Met 40 | 220 | 1.2 | TCLP #2 | 7.0→6.9 | .10 | 98.25 |
| 144 | Cr 40 Met 40 | 220 | 1.7 | TCLP #2 | 6.9→7.0 | .06 | 98.83 |
| Colorado | | | | | | | |
| 170 | Cr 400 Met 400 | 0 | — | DI | 7.3→7.6 | 24.27 | 59.54 |
| 171 | Cr 400 Met 400 | 2200 | — | DI | 7.2→7.8 | 1.37 | 97.77 |
| 173 | Cr 400 Met 400 | 2200 | 1.0 | DI | 7.2→7.8 | .60 | 99.00 |
| 174 | Cr 400 Met 400 | 2200 | 2.1 | DI | 7.3→7.8 | .55 | 99.08 |
| 176 | Cr 400 Met 400 | 0 | — | TCLP #2 | 6.7→6.3 | 22.20 | 62.99 |
| 177 | Cr 400 Met 400 | 2200 | — | TCLP #2 | 7.8→6.4 | .45 | 99.26 |
| 179 | Cr 400 Met 400 | 2200 | 1.0 | TCLP #2 | 7.3→6.4 | .38 | 99.38 |
| 180 | Cr 400 Met 400 | 2200 | 2.1 | TCLP #2 | 7.2→6.4 | .41 | 99.32 |

| | Pb | | Zn | | Cu | | Cd | | Ni | |
|---|---|---|---|---|---|---|---|---|---|---|
| Exp. # | Elution 200 ml ppm | Fixed % | Elution 200 ml ppm | Fixed % | Elution 200 ml ppm | Fixed % | Elution 200 ml ppm | Fixed % | Elution 200 ml ppm | Fixed % |
| Colorado | | | | | | | | | | |

TABLE IV-continued
Chromate Reduction and Fixation of Cr, Pb, Zn, Cu, Cd, Ni by Iron II and Acid Gel Column Experiments
30 g Soil: Colorado
Leaching Fluid: DI, TCLP #1, TCLP #2
Iron II Addition: 1.7 × stoichiometry for Cr VI reduction
Colume Effluent 200 ml
Cr 40 Met 40: 40 ppm each of Cr VI, Pb, Zn, Cu, Cd, Ni
Cr 400 Met 400: 400 ppm each of Cr VI, Pb, An Cu, Cd, Ni

| | | | | | | | | | | |
|---|---|---|---|---|---|---|---|---|---|---|
| 123 | <.001 | 100 | .02 | 99.67 | .20 | 96.83 | .056 | 99.08 | .21 | 98.42 |
| 129 | <.001 | 100 | .02 | 99.28 | .12 | 97.92 | .048 | 99.25 | .16 | 97.42 |
| 131 | <.001 | 100 | .008 | 99.83 | .17 | 97.08 | .049 | 99.25 | .18 | 97.08 |
| 132 | <.001 | 100 | .008 | 99.83 | .19 | 96.92 | .051 | 99.25 | .17 | 97.17 |
| 134 | .015 | 100 | .42 | 92.75 | .16 | 97.33 | .80 | 85.58 | .86 | 85.58 |
| 135 | .009 | 99.75 | .46 | 92.33 | .15 | 97.50 | .83 | 85.16 | .80 | 85.50 |
| 137 | <.001 | 100 | .32 | 94.75 | .14 | 97.67 | .74 | 87.63 | .55 | 90.83 |
| 138 | .02 | 99.83 | .19 | 96.83 | .16 | 97.42 | .79 | 86.83 | .50 | 91.17 |
| 140 | <.001 | 100 | .76 | 82.75 | .16 | 97.42 | 1.48 | 75.42 | 2.06 | 65.58 |
| 141 | <.001 | 100 | 1.07 | 82.17 | .14 | 97.67 | 1.44 | 76.17 | 2.01 | 66.67 |
| 143 | <.001 | 100 | .40 | 97.33 | .12 | 97.92 | .94 | 84.25 | .85 | 85.83 |
| 144 | .02 | 99.92 | .41 | 93.17 | .14 | 97.83 | .92 | 84.50 | .92 | 84.58 |
| Colorado | | | | | | | | | | |
| 170 | .55 | 99.08 | 1.78 | 96.88 | .59 | 99.03 | 3.73 | 93.69 | 3.22 | 94.63 |
| 171 | .02 | 99.86 | 1.15 | 98.08 | .25 | 99.59 | 4.83 | 91.94 | 2.16 | 96.40 |
| 173 | .06 | 99.90 | .23 | 99.54 | .45 | 99.25 | 2.79 | 95.34 | 1.25 | 97.93 |
| 174 | .01 | 99.98 | .19 | 99.68 | .50 | 99.09 | 2.03 | 95.12 | 1.37 | 97.73 |
| 176 | .005 | 99.99 | 51.8 | 13.58 | 7.35 | 87.75 | 48.3 | 21.09 | 48.1 | 19.87 |
| 177 | .10 | 99.83 | 37.5 | 37.23 | 7.55 | 94.91 | 32.4 | 45.88 | 35.6 | 40.55 |
| 179 | .13 | 99.38 | 29.5 | 50.85 | 2.32 | 96.13 | 36.4 | 39.26 | 27.9 | 53.40 |
| 180 | .16 | 99.32 | 28.3 | 44.58 | 2.74 | 95.43 | 36.7 | 38.83 | 22.5 | 62.42 |

In Table V we summarize experiments using a large excess of ferric iron of 6600 ppm and an alkaline aluminum oxide destabilized gel at 3.6% silica concentration, which is Zeolite Gel 2-10, and forty to four hundred parts by million soil loadings of each of lead, zinc, copper, cadmium and nickel in the soil samples. In these experiments Colorado, Round Rock and Balcones soils were all used. Consider Expts. No. 278, 285 and 287, the data indicates that with water extraction after treatment with 3.3 parts of ferric iron per part of total metal contaminant, which is 6600 ppm, and 3.6 percent silica in an alkaline gelling solution there will be less than 0.13 ppm of lead, zinc, cadmium or nickel and less than 0.53 ppm of copper in water eluted from a treated site.

Expt. 289 would indicate similar results for 40 ppm contaminant loading and pH 4.9 buffered extractant. With 400 ppm or more contaminant loading and buffered extraction eluent of nickel increases to 2 to 4 ppm; however, this leakage compares favorably with the 10.87 to 15.60 ppm nickel in the eluent from untreated soil.

We have found ferrous iron may be added into the gelling solution at about a pH of 10.2. Where chromate in the soil was about 40 ppm or less, treatment with a gelling solution containing ferrous sulfate reduced the chromium in the eluted water to less than 0.8 ppm. Extrapolation of data indicates less than 0.5 ppm in the eluent when contamination is less than 30 ppm chromium.

We found experimentally that a gel solution comprising: a) 3.5 percent silica in the form of sodium silicate; b) 0.6 percent ferrous sulfate; and c) 95.9 percent water when adjusted to a pH of 10.3 with sulfuric acid would gel in about eighteen hours.

Samples of soil labeled Colorado containing 200 ppm, 100 ppm and 40 ppm chromium VI were treated with this single mixture. The eluent contained 4.8 ppm, 2.2 ppm and 0.76 ppm respectively. A plot of the points indicated that at 30 ppm chromium loading that the eluent would contain less than 0.5 ppm chromium.

The pH of the eluent from distilled water leaching varied from 8.3 to 9.1. From previous work we would expect essentially total precipitation and fixation of other heavy metals at pH of 8.3 to 9.1.

This data would indicate that single step treatment by drilling holes and saturating the soil with a mixture as outlined is practical for sites with lower contamination.

From previous work we would expect some variation in the gel containing ferrous sulfate would still perform satisfactorily. Our data indicates that at a 9.2 pH the solution gels immediately but a 10.7 pH and 0.9 percent ferrous sulfate there was no gel formation in forty hours. We expect that gels containing about 0.6 percent ferrous sulfate and with pH adjusted to 10.3 to 11.1 would be optimum.

TABLE V
Fixation of Pb, An, Cu, Cd, Ni by 6000 ppm Fe III and Zeolite Gel 2-10

Leaching fluids: DI and TCLP #1
Metal levels: 40; 100; 400 ppm each of metals
Soils: 20 g Colorado, Round Rock and Balcones soils

| Exp. # | Metal Loading | Iron III ppm | % Silica | Extr. Fluid | pH Effluent | Pb Elution 500 ml ppm | Fixed % |
|---|---|---|---|---|---|---|---|
| Colorado | | | | | | | |
| 273 | Met 40 | — | — | DI | 8.1→8.1 | <.001 | 100.00 |
| 274 | Met 40 | 6600 | 3.6 | DI | 8.9→8.7 | <.001 | 100.00 |

TABLE V-continued

Fixation of Pb, An, Cu, Cd, Ni by 6000 ppm Fe III and Zeolite Gel 2-10

Leaching fluids: DI and TCLP #1
Metal levels: 40; 100; 400 ppm each of metals
Soils: 20 g Colorado, Round Rock and Balcones soils

| Exp. # | | | | | | | |
|---|---|---|---|---|---|---|---|
| 275 | Met 100 | — | — | DI | 7.9→8.0 | <.001 | 100.00 |
| 276 | Met 100 | 6600 | 3.6 | DI | 8.9→8.7 | <.001 | 100.00 |
| 277 | Met 400 | — | — | DI | 7.6→7.8 | .13 | 99.45 |
| 278 | Met 400 | 6600 | 3.6 | DI | 8.8→9.0 | <.001 | 100.00 |
| Round Rock | | | | | | | |
| 286 | Met 400 | — | — | DI | 8.0→7.7 | .004 | 99.98 |
| 287 | Met 400 | 6600 | 3.6 | DI | 8.4→7.8 | <.001 | 100.00 |
| Balcones | | | | | | | |
| 284 | Met 400 | — | — | DI | 7.8→7.8 | .06 | 99.99 |
| 285 | Met 400 | 6600 | 3.6 | DI | 8.5→8.0 | <.001 | 100.00 |
| Colorado | | | | | | | |
| 287 | Met 40 | — | — | TCLP #1 | 7.8→8.0 | .001 | 100.00 |
| 289 | Met 40 | 6600 | 3.6 | TCLP #1 | 8.8→7.2 | <.001 | 100.00 |
| 257 | Met 100 | — | — | TCLP #1 | 7.5→7.7 | .04 | 99.85 |
| 266 | Met 100 | 6600 | 3.6 | TCLP #1 | 8.7→7.2 | <.001 | 100.00 |
| 250 | Met 400 | — | — | TCLP #1 | 6.7→7.4 | 0.84 | 96.48 |
| 278 | Met 400 | 6600 | 3.6 | TCLP #1 | 8.3→8.2 | <.001 | 100.00 |
| Round Rock | | | | | | | |
| 290 | Met 400 | — | — | TCLP #1 | 7.9→8.3 | .16 | 99.34 |
| 291 | Met 400 | 6600 | 3.6 | TCLP #1 | 8.4→8.2 | <.001 | 100.00 |
| Balcones | | | | | | | |
| 288 | Met 400 | — | — | TCLP #1 | 8.1→8.1 | .16 | 99.34 |
| 289 | Met 400 | 6600 | 3.6 | TCLP #1 | 8.3→8.1 | <.001 | 100.00 |

| | Zn | | Cu | | Cd | | Ni | |
|---|---|---|---|---|---|---|---|---|
| Exp. # | Elution 500 ml ppm | Fixed % | Elution 500 ml ppm | Fixed % | Elution 500 ml ppm | Fixed % | Elution 500 ml ppm | Fixed % |
| Colorado | | | | | | | | |
| 273 | .007 | 99.42 | 0.10 | 95.83 | .04 | 98.50 | 0.11 | 96.50 |
| 274 | .008 | 99.42 | 0.17 | 92.75 | .007 | 99.75 | 0.10 | 95.75 |
| 275 | .05 | 99.17 | 0.25 | 95.93 | .18 | 97.00 | 3.18 | 94.70 |
| 276 | .005 | 99.90 | 0.27 | 95.40 | .01 | 99.80 | .15 | 97.47 |
| 277 | 0.90 | 96.22 | 0.40 | 99.35 | 6.40 | 73.37 | 2.00 | 91.67 |
| 278 | .004 | 99.98 | 0.36 | 99.53 | .04 | 99.85 | 0.12 | 99.50 |
| Round Rock | | | | | | | | |
| 286 | 0.10 | 99.19 | 0.42 | 98.33 | 2.30 | 90.37 | 0.58 | 97.59 |
| 287 | <.001 | 100.00 | 0.52 | 97.81 | .09 | 99.63 | 0.10 | 99.57 |
| Balcones | | | | | | | | |
| 284 | 0.61 | 97.50 | 0.08 | 99.68 | 1.70 | 92.54 | 0.19 | 99.20 |
| 285 | <.001 | 100.00 | 0.10 | 99.57 | .005 | 99.82 | 0.05 | 99.79 |
| Colorado | | | | | | | | |
| 287 | 0.37 | 84.50 | .09 | 99.62 | .70 | 71.25 | .66 | 72.29 |
| 289 | 0.01 | 99.25 | .12 | 99.58 | .04 | 98.50 | .12 | 94.83 |
| 257 | 3.30 | 44.97 | .29 | 95.13 | 2.56 | 57.10 | 4.40 | 26.67 |
| 266 | 0.19 | 96.77 | .18 | 96.90 | .18 | 96.97 | .45 | 92.37 |
| 250 | 24.3 | 0 | 2.81 | 88.33 | 16.50 | 31.19 | 15.60 | 35.05 |
| 278 | 0.75 | 96.85 | .56 | 97.63 | 1.05 | 95.63 | 3.82 | 83.66 |
| Round Rock | | | | | | | | |
| 290 | 5.70 | 76.18 | .63 | 97.31 | 6.58 | 72.63 | 12.90 | 46.23 |
| 291 | .04 | 99.83 | .43 | 98.33 | .21 | 99.17 | 1.98 | 92.10 |
| Balcones | | | | | | | | |
| 288 | 5.29 | 77.94 | .59 | 97.50 | 2.34 | 90.20 | 10.87 | 54.78 |
| 289 | .04 | 99.83% | .10 | 99.58 | .06 | 99.75 | 2.58 | 89.19 |

All the above experimental work outlined in Tables III, IV, and V was performed by loading the soil as indicated with metals, treating with the gelling solution and air drying at 35° C. and grinding before performing extraction. In Table VI we show results of experiments to determine the effect of temperature on gel formation. A portion might become as hot as 35° C. when the treating fluids, the iron solution and the gelling solution are actually injected in soil. A series of sequential batch extractions were run with one sample being air dried at 35° C., a duplicate sample allowed to cure at room temperature, which is approximately 23° C., and another sample held at 35° C. but not dried, to more closely duplicate the chemical holding power of the treated soil. These sequential batch leaching tests were run by equilibrating 30 gm of the treated sample cured as indicated, with 50 ml of extraction fluids which were distilled water, and TCLP#1, a pH 4.9 buffered solution. After equalibration the samples were filtered and filtrate tested. Each sample was sequentially extracted eight times and total micrograms of eluted metals were determined and these results are summarized in Table VI. Examination of the results indicate that all treatments are approximately equal, thus indicating that the holding power or solubility reduction of treated soil as determined and reported in Tables III, IV, and V should be comparable to field use.

TABLE VI

Sequential Batch Extractions Using
1) Gel Air Dried at 35° C.; 2) Gels Wet Cured at Room Temperature; 3) Gels Wet Cured at 35° C.

| Soil | Met | Treatment Fe III ppm | Gel | Extr. Fluid | pH Range | Elution in 8 batches (400 ml) in Ug | | | | | Curing Condition |
|---|---|---|---|---|---|---|---|---|---|---|---|
| | | | | | | Pb | Zn | Cu | Cd | Ni | |
| Colo. | 400 | 6600 | 3.6 | DI | 8.5→8.8 | 16.5 | 43.5 | 239.0 | 49.2 | 87.0 | 35° C. Air Dried |
| Colo. | 400 | 6600 | 3.6 | DI | 9.4→9.2 | 13.5 | 34.5 | 280 | 35.5 | 84.0 | Room Temp. |
| Colo. | 400 | 6600 | 3.6 | DI | 9.4→9.4 | 5.0 | 46.5 | 371 | 44.5 | 107.0 | 35° C. Wet Cured |
| R.R. | 400 | 6600 | 3.6 | DI | 8.6→8.7 | 8.5 | 37.0 | 173 | 24.5 | 49.0 | 35° C. Air Dried |
| R.R. | 400 | 6600 | 3.6 | DI | 9.3→9.4 | 13.5 | 45.0 | 228 | 58.0 | 66.0 | Room Temp. |
| R.R. | 400 | 6600 | 3.6 | DI | 9.1→9.2 | 15.5 | 33.0 | 314 | 37.0 | 69.5 | 35° C. Wet Cured |
| Balc. | 400 | 6600 | 3.6 | DI | 8.8→8.8 | 11.5 | 27.0 | 58.3 | 31.7 | 30.5 | 35° C. Air Dried |
| Balc. | 400 | 6600 | 3.6 | DI | 9.6→9.7 | 17.5 | 51.0 | 93.0 | 58.5 | 26.5 | Room Temp. |
| Balc. | 400 | 6600 | 3.6 | DI | 9.6→9.7 | 15.5 | 50.0 | 115.5 | 44.2 | 36.5 | 35° C. Wet Cured |
| Colo. | 400 | 6600 | 3.6 | TCLP #1 | 7.9→7.1 | 0 | 715 | 249 | 1,360 | 1,042 | 35° C. Air Dried |
| Colo. | 400 | 6600 | 3.6 | TCLP #1 | 8.2→7.1 | 1 | 637 | 215 | 1,218 | 863 | Room Temp. |
| Colo. | 400 | 6600 | 3.6 | TCLP #1 | 8.0→7.1 | 0 | 509 | 348 | 1,084 | 677 | 35° C. Wet Cured |
| R.R. | 400 | 6600 | 3.6 | TCLP #1 | 7.7→7.3 | 0 | 114 | 165 | 1,027 | 468 | 35° C. Air Dried |
| R.R. | 400 | 6600 | 3.6 | TCLP #1 | 7.9→7.2 | 0 | 95 | 143 | 839 | 386 | Room Temp. |
| R.R. | 400 | 6600 | 3.6 | TCLP #1 | 7.7→7.3 | 0 | 63 | 241 | 654 | 273 | 35° C. Wet Cured |
| Balc. | 400 | 6600 | 3.6 | TCLP #1 | 7.7→7.5 | 3 | 171 | 72 | 267 | 566 | 35° C. Air Dried |
| Balc. | 400 | 6600 | 3.6 | TCLP #1 | 8.1→7.5 | 0 | 123 | 63 | 254 | 488 | Room Temp. Wet Cured |
| Balc. | 400 | 6600 | 3.6 | TCLP #1 | 7.9→7.5 | 0 | 92 | 82 | 234 | 357 | 35° C. Wet Cured |

We have shown both by column leaching and sequential extraction that dual treatment allows metals to be held tightly enough to greatly reduce amount of each in the leachate. We have also shown that a single step treatment should be practical in some cases. Now the total amount leached from a treated contaminated site will depend upon flow of leachate, normally water, through the soil and the concentration of contaminants dissolved in the water as the water flows through.

Hydraulic conductivity or soil permeability may be measured by either a constant head or a falling head permeator as outlined by D. R. Todd in Groundwater Technology (1959). From Darcy's law for a constant head experiment:

Hydraulic Coefficient $K = Q \cdot L / A \cdot H$ [cm/sec] = (I)

$Q = V/t$ — effluent flow rate (cm$^3$/sec)
$L$ = height of soil column (cm)
$A$ = cross sectional area of soil column (cm$^2$)
$H$ = static head (cm)
and for a falling head experiment:

Hydraulic Coefficient $K = a \cdot L / A \cdot t \ \ln(H_0/H_1)$
[cm/sec] = (II)

$L$ = height of soil column (cm)
$A$ = cross sectional area of soil column (cm$^2$)
$a$ = cross sectional area of the static head column (cm$^2$)
$H_0$ = static head at beginning of experiment (mm)
$H_1$ = static head at end of experiment (mm)
$t$ = duration of experiment (sec)

A constant head pressure and determination of K as outlined in (I) was used to estimate the hydraulic coefficient of soil columns treated with in situ gels and a falling head and determination as outlined in (II) was used for virgin soils. Untreated Colorado sample gave $K = 1.5 \times 10^{-2}$ The range of values for unconsolidated natural deposits as published in Freeze and Cherry, Ground Water pg. 29, Prentice-Hall, 1979 are as follows:

| | |
|---|---|
| gravel: | $K = 10^{+2}$ to $10^{-1}$ (cm/sec) |
| clear sand: | $K = 1$ to $10^{-3}$ (cm/sec) |
| silty sand: | $K = 10^{-1}$ to $10^{-5}$ (cm/sec) |
| silt, loess: | $K = 10^{-3}$ to $10^{-7}$ (cm/sec) |
| unweathered marine clay: | $K = 10^{-7}$ to $10^{-10}$ (cm/sec) |

These results are comparable to results for our samples. We treated the most permeable of our samples with silica gelling agent with results from four determinations as shown in Table VII below:

TABLE VII

Experimental Parameters Used to Determine the Hydraulic Conductivity of Treated Colorado Soil.

| Q (cm$^3$/sec) | $1.11 \times 10^{-5}$ | $8.0 \times 10^{-6}$ | $1.27 \times 10^{-5}$ | $7.75 \times 10^{-6}$ |
|---|---|---|---|---|
| L (cm) | 7.59 | 7.59 | 6.33 | 5.69 |
| A (cm$^2$) | 3.14 | 3.14 | 3.14 | 3.14 |
| H (cm) | 32.89 | 32.89 | 36.69 | 35.42 |
| K (cm/sec) | $8.5 \times 10^{-7}$ | $5.8 \times 10^{-7}$ | $7.0 \times 10^{-7}$ | $4.0 \times 10^{-7}$ |

The average of the four results gave $K = 6 \times 10^{-7}$ indicating that permeability of untreated Colorado soil was equal to $1.2 \times 10^{-2}$ divided by $6 \times 10^{-7}$ or approximately $2.5 \times 10^4$ or 20,000 times more permeable than gel treated Colorado soil. The treated soil permeability was similar to that of unweathered marine clay of the type used in the past for lining waste ponds.

Using the data for zinc fixation as shown in Table IV, Expt. No. 277 and 278, we see that 0.90 ppm of zinc eluted from untreated soil containing 400 ppm of zinc plus other metals and 0.004 ppm eluted with distilled water from treated soil. Our permeability data shows untreated Colorado sample soil has a permeability of $1.2 \times 10^{-2}$ cm/sec., whereas treated Colorado sample soil has permeability of $6 \times 10^{-7}$ cm/sec. This means that in the same period of time and for the same area that there will be $1.2 \times 10^{-2}$ cm/sec divided $6 \times 10^{-7}$ cm/sec. or 20,000 times more flow through the untreated soil. Now if one volume containing 1 ppm of metal elutes from the treated area and mixes with 20000 volumes of water from the untreated area the mixture would contain less 0.05 parts per billion of zinc. This would be almost an undetectable amount. With a reasonable underground pressure gradient for water flow of 1 cm per meter and using the following data:

| | |
|---|---|
| Permeability of untreated Colorado soil | $1.2 \times 10^{-2}$ (cm/sec) |
| Permeability of treated Colorado soil | $6 \times 10^{-7}$ (cm/sec) |
| Density of Colorado soil | 1.15 (g/cm$^3$) |
| Void Volume of Colorado soil | 41 (cm$^3$/100 g) |
| we find: | |
| Void volume of 1 m$^3$ Colorado soil | 472 (ltr) |
| Flow rate through 1 m$^3$ untreated soil | 37,800 (ltr/year) |
| Flow rate through 1 m$^3$ treated soil | 1.9 (ltr/year) |

Since 40 pore volumes in 1 m$^3$ corresponds to $40 \times 472 = 18,800$ ltr, we calculate for a flow rate of 1.9 ltr/year, that it will take $$18,800 \text{ ltr}/1.9 \text{ (ltr/year)} = 9,900 \text{ years}$$

to eluate 40 pore volumes from one cubic meter of soil under the assumed conditions, provided the gel integrity does not change.

In summary the data shows that leaching from a treated area is quite slow and the calculated contamination of ground water would be several thousand fold less than the amount that leaches from a treated site.

The greatest leaching shown in our data is for copper, Expt. 287 in Table IV at 0.52 parts per million. When we consider that water flow through an area the same size as the treated area is about 20,000 times the flow in the treated area the ground water formed from the mixture of the two eluents would have an average copper concentration of 0.52 divided by 20,000 or less than 0.03 of a part per billion, which is an undetectable amount.

This leads to the conclusion that proper soil treatment renders a hazardous waste site non-hazardous. In alkaline type soils a treatment process encompasses saturating the soil with an excess of ferric salt when chromium is not present and saturating the soil with a mixture of ferrous and ferric salt with the mixture containing a minimum of the theoretical amount of ferrous salt necessary to reduce the chromium present; following saturation with ferrous or ferrous plus ferric salts the ground would be allowed to dry and then would be resaturated with an alkaline destabilized silica gel mixture with a mixture containing 3.6 percent silica and about 0.9 percent sodium aluminate being preferred. Mixtures containing 1.0 percent silica may be equally effective.

In acidic soils a first saturation treatment with a soluble alkali to increase the soil pH to a minimum of 7.5 for hydroxide precipitation of metals with treatment by saturation using an excess of ferrous plus ferric iron or ferric iron alone when chromium is not present is indicated. However, since ferrous iron will react to reduce chromium in an acid medium the alkalinity of the sodium silicate gel may be adjusted to the pH where the soil acidity will cause gellation. This pH is preferably about 8.0. Saturation of the soil may be by mixing or spraying but in most cases may be achieved more economically by determining untreated soil permeability in alkaline or neutralized soils and thereafter drilling holes spaced so as to allow saturation of the area to be treated by treating liquids as outlined. The treating liquids used in the invention are in the form of solutions so that the treating chemicals will not be filtered out by the earth thereby allowing the injection of the treating liquid.

The treatment process entails determining the extent of the contaminated area; determining the particular metal contaminants and maximum and average amounts of metals; determining pH of the soil and necessity for alkaline treatment or adjustment of pH of the silicate gelling solution if the soil is below pH of 7.0; determining soil permeability and void volume to determine spacing and amount of both iron containing treatment fluids and amount of gelling fluid necessary to fill at least a minimum of the void space in the area being treated. Test holes to determine leakage from the treated area would be installed to allow retreatment if any leakage is detected.

What is claimed is:

1. A composition for organic and metal contaminant fixation in soil comprising:
   a) a first solution of a chromate reduction and heavy metal precipitation means comprising an aqueous solution containing from 200 to 10,000 ppm of a soluble ferric salt and a soluble ferrous salt in a minimum of a stoichometric amount to reduce chromium VI present in said soil;
   b) and a second solution of an aqueous gel formation means comprising:
   0.5 to 7.5% of silicon dioxide in sodium silicate
   0 to 3% of alkaline aluminate
   85 to 98% of water
   said first solution being used first to essentially saturate said soil and said second solution being applied to resaturate said soil after a minimum of an eight hour drying period following saturation of said soil with said first solution.

2. A composition for organic and metal contaminant fixation in soil comprising an aqueous solution of about 0.6 percent of a ferrous iron salt and about 3.5 percent of silica in the form of sodium silicate with sufficient sulfuric acid to adjust the pH to about 10; said solution acting to reduce chromates to allow coprecipitation with iron and other heavy metals and further acting to reduce permeability of said soil.

3. A process for organic and heavy metal contaminant fixation in soil comprising:
   a) mixing with said contaminated soil a first solution means to reduce chromate and to coprecipitate said chromate and said heavy metals and;
   b) mixing thereafter a second solution means comprising:
   0.5 to 7.5% silica in sodium silicate
   0 to 3% of alkaline aluminate
   and 85 to 98% water
   to form an essentially nonleachable gel structure in said contaminated soil.

4. A process for organic and heavy metal contaminant fixation in soil as in claim 1 wherein said first solution means comprises 200 to 10,000 ppm of a soluble ferric salt and a minimum of 100 ppm of a soluble ferrous salt.

5. A process for organic and heavy metal contaminant in contaminated soil comprising:
   a) mixing said contaminated soil with a first aqueous solution means to essentially saturate said contaminated soil; said solution means containing a minimum amount of a ferrous salt to reduce chromium VI in said soil;
   b) mixing thereafter with said soil a second aqueous solution means comprising:

0.5 to 7.5% silica in an alkaline solution 0 to 3% alkaline aluminate and sufficient alkalinity to give a minimum pH of 7.5 when mixed with said soil; said solutions means then forming an essentially nonleachable gel structure in said soil.

6. A process for organic and heavy metal contaminant fixation in contaminated soil comprising:
   a) injecting a first aqueous solution means in a pattern to saturate said soil with said solution means acting to reduce chromate and to coprecipitate said heavy metals and said chromates;
   b) allowing said saturated contaminated soil to dry for a minimum of eight hours;
   c) injecting a second aqueous solution means to resaturate said contaminated soil; said second aqueous solution means comprising:

0.5 to 7.5% silica in alkaline solution 0 to 3% alkaline aluminate with sufficient alkalinity to give a minimum pH of 7.5 when mixed with said soil and acting to form an essentially non-leaching gel.

7. A process for organic and heavy metal contaminant fixation in contaminated soil as in claim 5 comprising:
   a) injecting said first solution means in a pattern to saturate said contaminated soil and with said solution means acting to reduce chromate and to coprecipitate said heavy metals and said chromates;
   b) allowing said saturated contaminated soil to dry for a minimum of eight hours;
   c) injecting a second solution means to resaturate said contaminated soil; said second solution means comprising a sodium silicate solution containing a minimum of 0.5 sodium silicate and a minimum of 0.1% alkaline aluminate to form a stable gel in said contaminated soil.

8. A composition for Organic and Metal contaminant fixation in soil comprising:
   a) a first aqueous solution means containing from 200 to 10,000 ppm of a soluble ferric iron; and
   b) a second aqueous solution of a gel formation means comprising:

0.5 to 7.5% sodium silicate 0 to 3% of a sodium silicate solution destabilization salt 85 to 98% water and acting to form an essentially non-leaching gel in soil previously treated with said first solution means.

9. A composition for Organic and Metal contaminant fixation in soil comprising:
   a) a first aqueous solution means containing a minimum of a stoichometric amount of a soluble ferrous iron to reduce chromium VI in said soil; and
   b) a second aqueous solution of a gel formation means comprising:

0.5 to 7.5% sodium silicate 0 to 3% of a sodium silicate solution destabilization salt 85 to 98% water and acting to form an essentially non-leaching gel in soil previously treated with said first solution means.

* * * * *